(12) United States Patent
Kwok

(10) Patent No.: US 8,082,199 B2
(45) Date of Patent: Dec. 20, 2011

(54) MULTIPLE VARIABLE OUTLETS SHOOTING APPARATUS

(76) Inventor: Ming Yat Kwok, Vancouver (CA)

( * ) Notice: Subject to any disclaimer, the term of this patent is extended or adjusted under 35 U.S.C. 154(b) by 884 days.

(21) Appl. No.: 11/098,196

(22) Filed: Apr. 5, 2005

(65) Prior Publication Data

US 2006/0219750 A1 Oct. 5, 2006

(51) Int. Cl.
G06Q 40/00 (2006.01)
F42B 8/00 (2006.01)
F41A 9/00 (2006.01)

(52) U.S. Cl. .................. 705/35; 102/444; 89/33

(58) Field of Classification Search .............. 705/35
See application file for complete search history.

(56) References Cited

U.S. PATENT DOCUMENTS

| | | | |
|---|---|---|---|
| 8,528 A | 11/1851 | Lemmer | |
| 24,518 A | 6/1859 | Jeffers | |
| 1,217,415 A | 2/1917 | Colomyjczuk | |
| 1,229,421 A | 6/1917 | Downs | |
| 1,276,689 A | 8/1918 | Poudrier | |
| 1,418,964 A | 6/1922 | Norman | |
| 2,668,499 A | 2/1954 | Mourlaque | |
| 2,952,091 A | 9/1960 | Blanchard | |
| 3,260,009 A | 7/1966 | Hillberg | |
| 3,505,926 A | 4/1970 | Johnson | |
| 3,545,116 A | 12/1970 | Babington | |
| 4,400,900 A | 8/1983 | Hillberg | 42/69 |
| 4,559,737 A | 12/1985 | Washington | 43/59 |
| 4,625,443 A | 12/1986 | Beretta | 42/42 |
| 4,748,892 A | 6/1988 | Dardick | 89/13.05 |
| 4,757,740 A | 7/1988 | McFarland | 89/7 |
| 4,858,205 A | 8/1989 | Harrison | 367/144 |
| 4,912,869 A | 4/1990 | Govett | 42/105 |
| 5,020,411 A * | 6/1991 | Rowan | 89/1.11 |
| 6,401,592 B1 * | 6/2002 | Rostocil | 89/33.16 |
| 6,460,281 B1 | 10/2002 | Schaeffer | 42/42.01 |
| 6,854,374 B1 | 2/2005 | Breazeale | 86/50 |
| 6,886,467 B1 * | 5/2005 | Haeselich | 102/444 |

FOREIGN PATENT DOCUMENTS

CH 4379580 4/1983
DE 4524697 6/1985

* cited by examiner

Primary Examiner — Ella Colbert
Assistant Examiner — John Anderson

(57) ABSTRACT

A shooting device with multiple barrels (10b) shooting multiple projectors (55) which propels multiple carrying cams (50) through multiple curve and straight channels (10) of which are connected with differentiated threaded pipe nuts (10a), reinforcement barrels and channels (10c) and (10d) are necessary to minimize distortion. The main shooting body (11) is divided into two halves (12) and (14) with port doors (12b) and their controls (17) and charge cartridge (12c) and ignition device (12s). Carrying cams (50) are connected with, but not limit to, fisherman's net and or safety net to distant multiple desired locations in an instance.

15 Claims, 6 Drawing Sheets

MULTIPLE VARIABLE OUTLETS SHOOTING APPARATUS

BACKGROUND

1. Field of Invention

This invention relates to a shooting apparatus with curve and straight variable reinforced outlets shooting projectiles propelling carrying cams with working materials to predetermined locations all in one instance.

2. Description of Prior Art

Since the beginning of mankind there are ways of shooting a projectile to a distance and not to a very precise location and then we have tools to shoot in succession with deadly accuracy. In recent years there are apparatuses that can shoot multiple projectiles to an approximate location or object.

In U.S. Pat. No. 4,912,869 to Peter Govett (1990) discloses a net gun to improve a way to catch animals. It is a regular bolt action rifle shooting a shell without a bullet but instead of one barrel, it is fitted with four and a manifold shooting out a net to catch live animal instead of shooting a tranquilizer to disable an animal. To aim a small net at a small animal, you have to be very accurate and the net has to catch the animal right at the centre in order to wrap it and so immobile it, there is going to be many tries. A big net will be needed to catch a large animal but it will be too heavy for even raising it and aiming with accuracy at the same time will be very difficult.

In U.S. Pat. No. 4,559,737 to Richard J. Washington (1985) discloses a snare device in the form of a shot gun but no pellets are shooting out, instead a Y shaped tube is fitted at the end of the barrel where it will propel out two projectiles connected with a line to and wrap around the aimed criminal so to immobile it. Projectiles coming out of the Y could hurt unintended by-standers in a crowded situation and the line because it is shooting out from a Y could quickly run out of its length and dropped where it ended, so the right distance between the shooter and the criminal is critical if it is not impossible to maintain.

In U.S. Pat. No. 1,276,689 to Alfred Poudrier (1918) discloses a cannon with a Y shaped barrel and shooting two shots connecting with a chain. The chain is not very long so the range will be short and it is difficult to aim two objects at the same time.

The present invention is a shooting instrument made with high value steel constructed with multiple curve and or straight barrels and channels. Those barrels and channels are reinforced with backing plates and ridges to minimize distortion and help installation to other solid foundation. This instrument shoots projectiles which in turn propelling carrying cams to multiple calculated locations in one instance with the activation of a button from a remote location if it is so desirable. The carrying cams will be carrying, but not limited to, fishing net for the fishermen, net to catch animals including criminals, and safety nets to protect human, etc. The power discharge housing is of two halves, one of which is the manifold-barrel where individual cavities are leading to each manifold and barrel, the other half of the power discharge housing is the charge chamber equipped with electronically controlled port doors which in turn controlling where the power is going into each cavity. The cartridge for the shooting instrument is made of brass base and plastic hull with crimped top filled with adequate straight shooting charge. The side of the brass base has a sealed punch hole. Ignition device for the shooting apparatus is an insulated hollow bar with a small opening and a sharp protrusion at mid section and two conductive end caps and a strip join together. The ignition device sits one way only in a slot below the charge cartridge and when pressed against each other the seal of the punch hole will split open and a small amount of charge powder will drop down below onto the conductive strip forming a fuse for the charge cartridge, when electricity applies to the end caps the conductive strip will spark so to ignite the fuse and let off a set charge inside the cartridge produces adequate pressure for the job.

OBJECTS OF THE INVENTION

Accordingly, besides the objects and advantages of the multiple variable outlets shooting apparatus described above, several objects and advantages of the present invention are:

(a) To provide an apparatus that can shoot many projectiles.
(b) To provide many carrying cams for the work.
(c) To provide many reinforced barrels and channels.
(d) To provide reinforced curve and straight barrels and channels.
(e) Enable remote control for the ignition system.
(f) To provide individual control of the entrance of power to the manifolds and barrels
(g) To provide an apparatus that shoots multiple targets all at once with precise accuracy.

BRIEF DESCRIPTION OF THE DRAWINGS

These and other objects and advantages of the invention will be apparent upon reading the following description in conjunction with the invention.

DESCRIPTION OF THE PREFERRED EMBODIMENT

Figure 1:
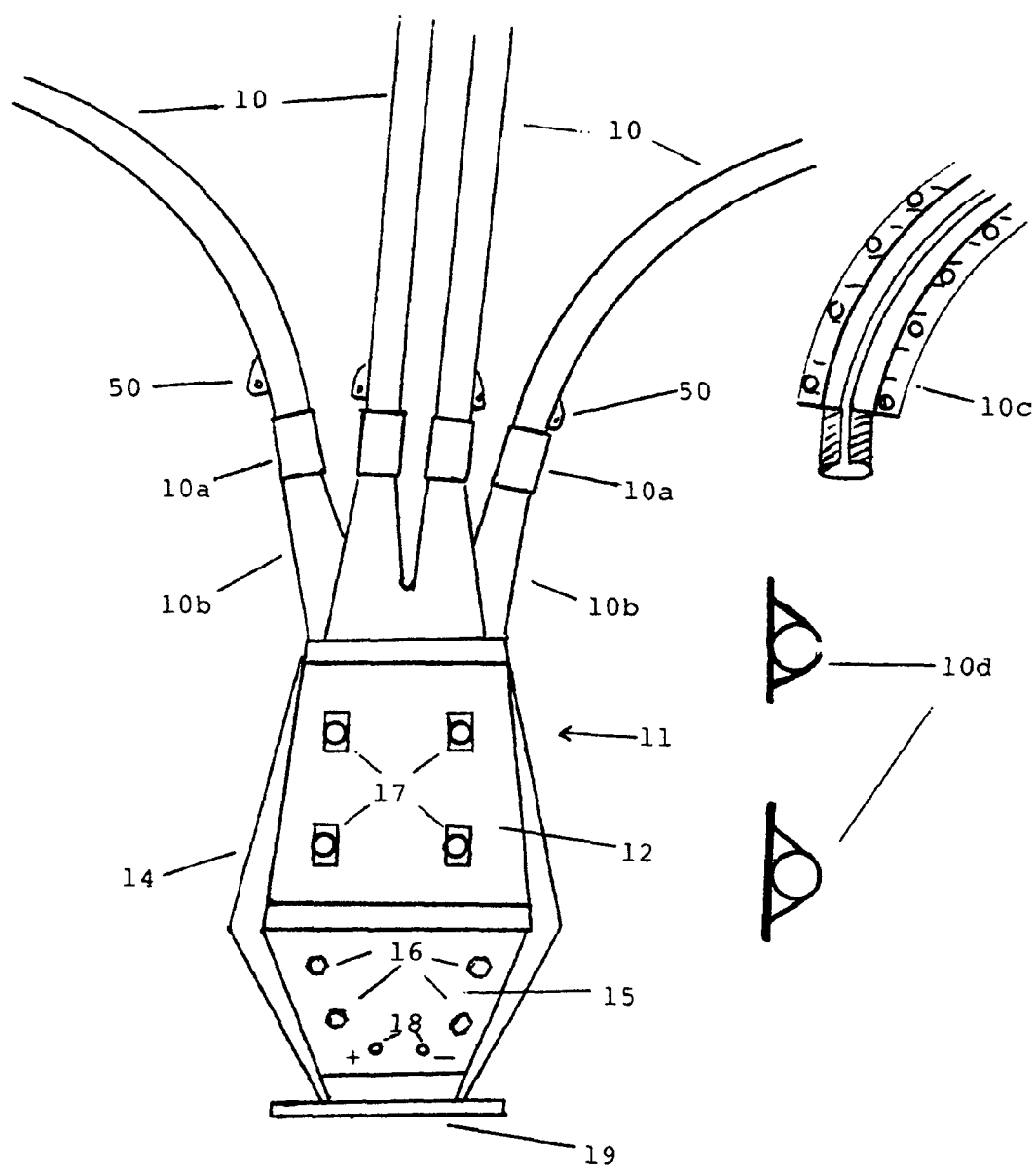
FIG. 1 is a frontal view of the multiple variable outlets shooting apparatus and showing also are the enlarged cut away views of the barrels and channels and their reinforcement arrangement.

Referring to FIG. 1 is the complete frontal view of the multiple variable outlets shooting apparatus (11) made of strong high value metal. Differentiated threaded pipe nuts (10a) lock the channels (10) with the carrying cam (50) inside and the manifold-barrels (10b) together, reinforced channels (10c) and reinforced barrels (10d) are necessary. The shooting apparatus is divided into two halves, one of which is the manifold-barrel (14) and the other the charge chamber (12) with electrical solenoid controls (17) to each power discharge port doors (12b), a cartridge chamber (15) with a lid is bolted close with four bolts (16) is also with this unit, terminals (18) are leading to the ignition device.

Figure 2:
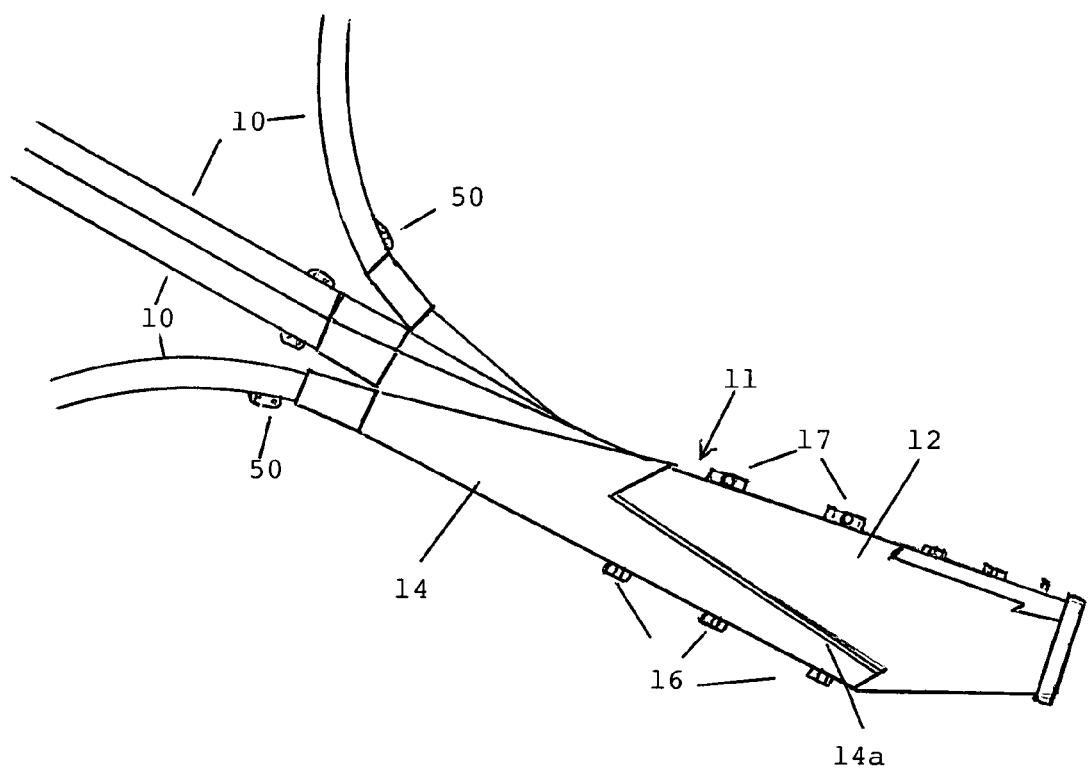
FIG. 2 is the multiple variable outlets shooting apparatus viewing from the side.

Referring to FIG. 2 is the side view of the multiple variable outlets shooting apparatus (11). Showing the two halves (14) and (12) slide into the tapered slots of each with a gasket (14a) at the middle and showing also are three of nine high strength bolts (16) that bolt the unit together.

Figure 3:
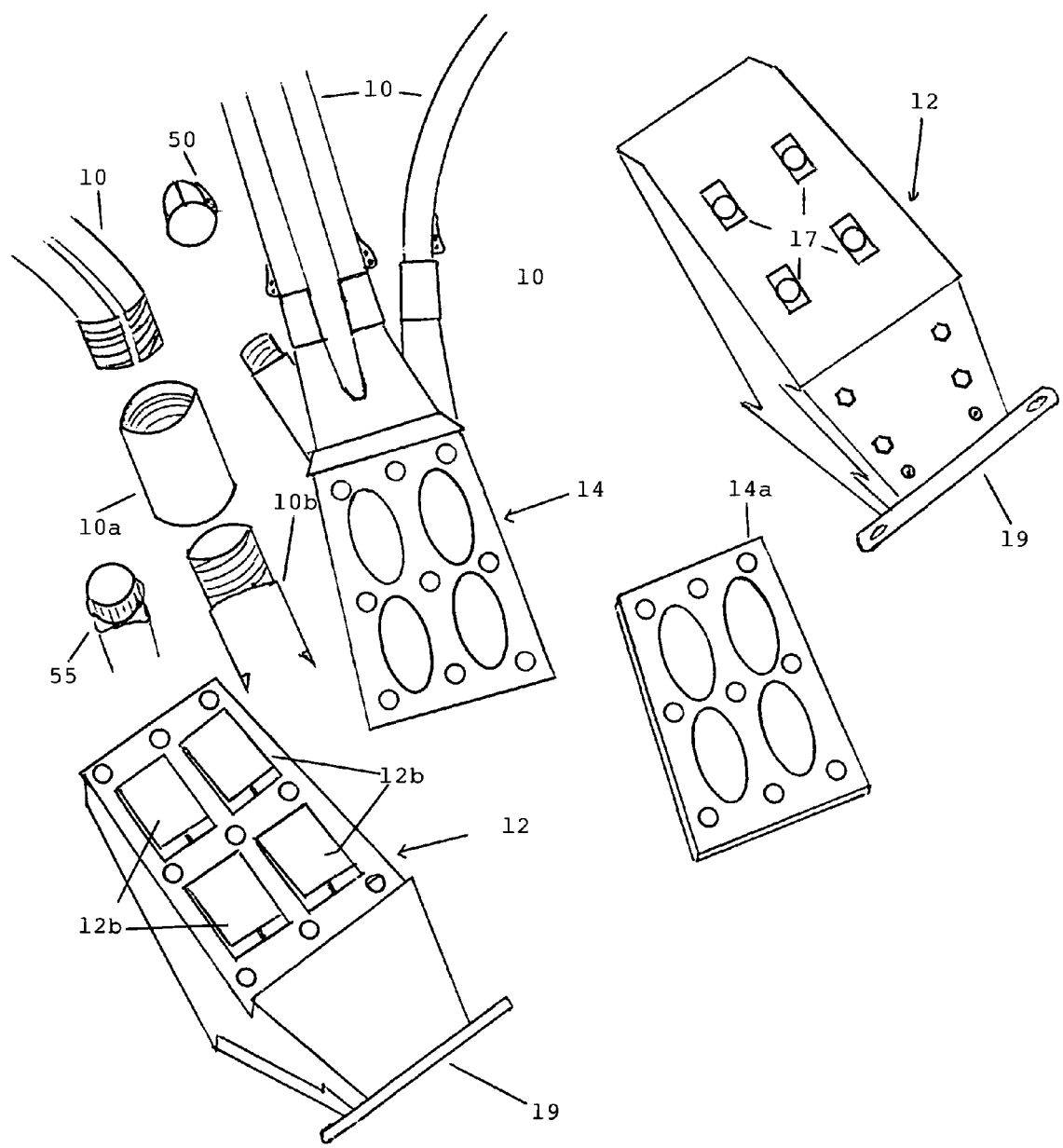
FIG. 3 shows the various parts of the shooting apparatus when taken apart.

Referring to FIG. 3 is the multiple variable outlets shooting apparatus (11) taken apart with the power charge chamber (12) flip over to show the port doors (12b) which are regulating charge power to the cavities of the manifold-barrels (14) are controlled by electrical solenoids (17), a leak proof gasket (14) is placed between the two halves of the shooting apparatus and a base plate (19) is mounted at the base. A small section of the channel (10) with the carrying cam (50) outside and barrel (10b) with the projectile (55) outside are disassembled and enlarged, showing also the differentiated threaded pipe nut (10a).

Figure 4:
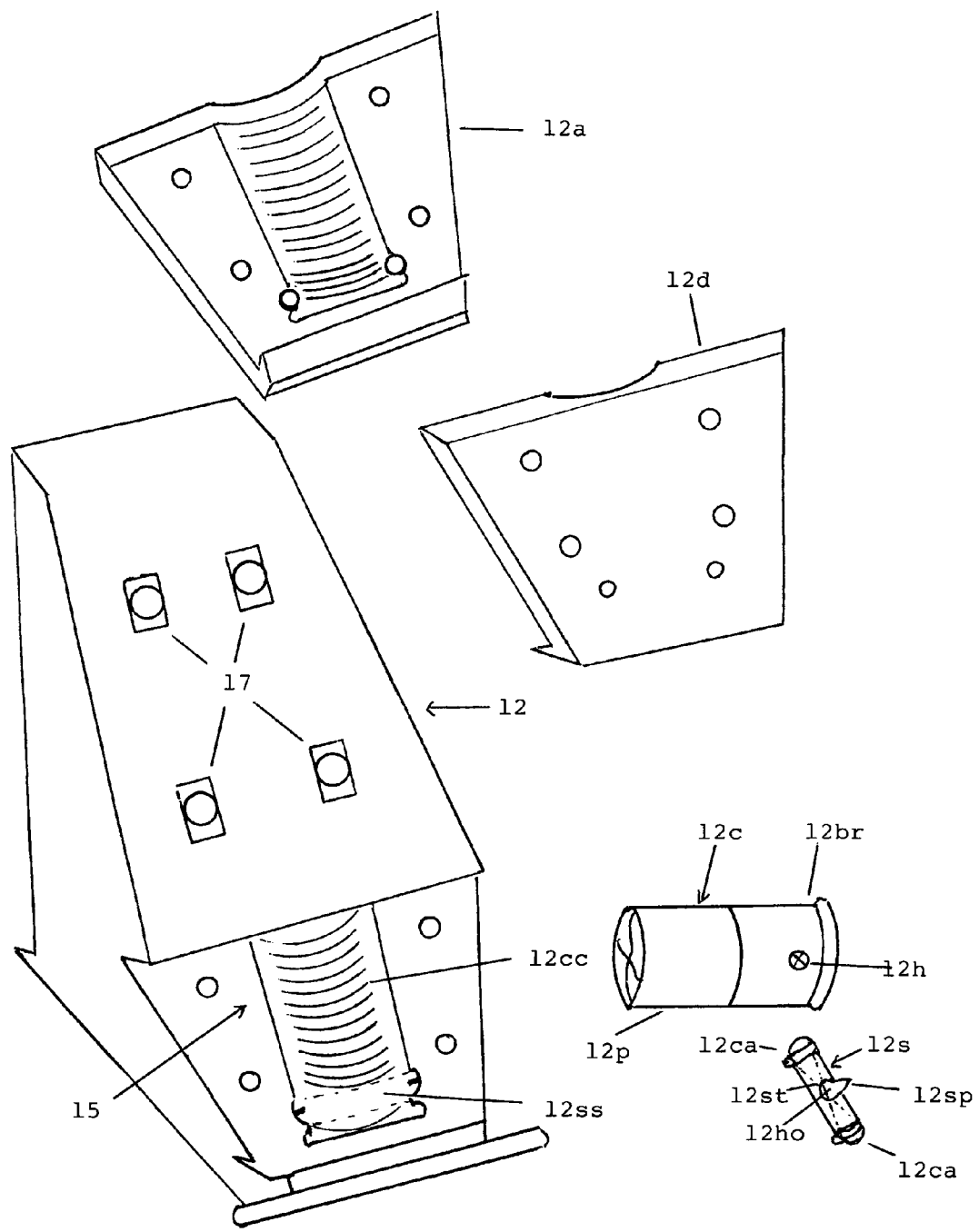
FIG. 4 is showing the charge chamber with its lid opened and showing also are the cartridge and the ignition device.

Referring to FIG. 4 is the charge chamber (12) with all the port door control solenoids (17) and its lid (12d) removed and turn over lid (12A), the lid with tapered and hooked ends slides into the charge chamber block (12) and bolted down with high strength bolts to contain the power. The ignition device (12s) made of an insulated tube with opening and sharp protrusion at the mid section is also capped at both ends of the small tube and connected with a thin strip, both the caps and strip are made of conductive material. The ignition device (12a) placed in the slot (12ss) directly below the cartridge seat (12cc) one way only with the sharp pointed protrusion (12sp) up. The cartridge (12c) is made of brass base (12br) with a sealed small hole (12ho) near the bottom end and a plastic hull (12p) with crimped top is filled with adequate straight shooting powder charge, when placed with the hole (12ho) face down pressed against the sharp protrusion (12sp) of the ignition device (12s) a small amount of powder will drop down to the opening (12ho) of the conductive strip (12st) and electricity is applied to the end caps (12ca) and the strip (12st) sparks and ignites the charge of the cartridge and produces power to do the job.

Figure 5:
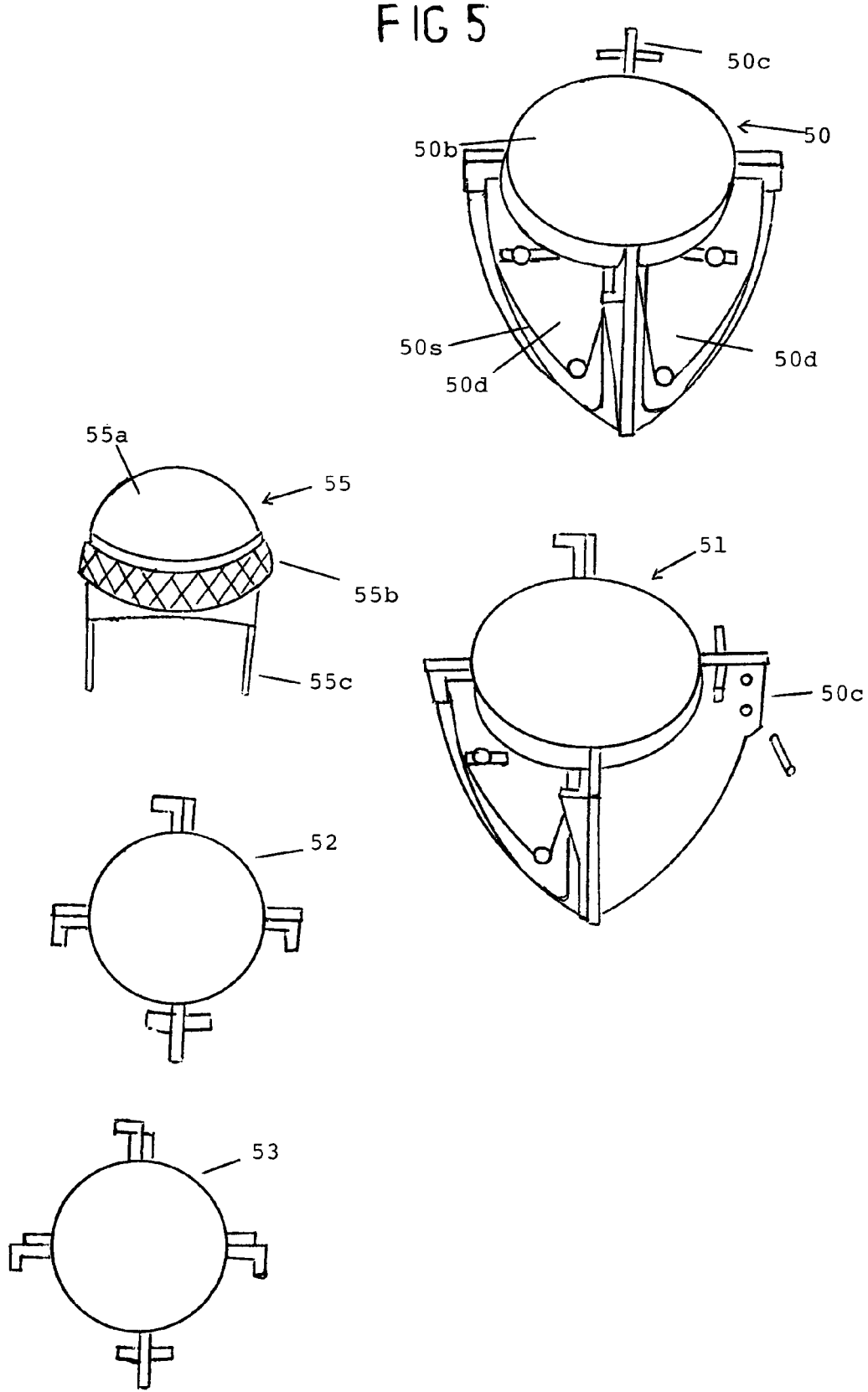
FIG. 5 is the carrying cam in its various position and also a projectile.

Referring to FIG. 5 is the carrying cam (50) viewing with the slider plate (50c) pointed away and carrying cam (51) is showing the slider plate and its roll pin, carrying cam (52) has its spring (50s) operated lock plates (50d) retracted, carrying cam (53) has its lock plates (50d) expanded and irreversible effectively lock up at designated location. Projectile (55) is insulated at the middle with a felt belt (55b) to help easy sliding and minimize pressure loss, a rubberized cap (55a) at the forth front is for bouncing action and flexible tails (55c) are for directional purpose.

Figure 6:
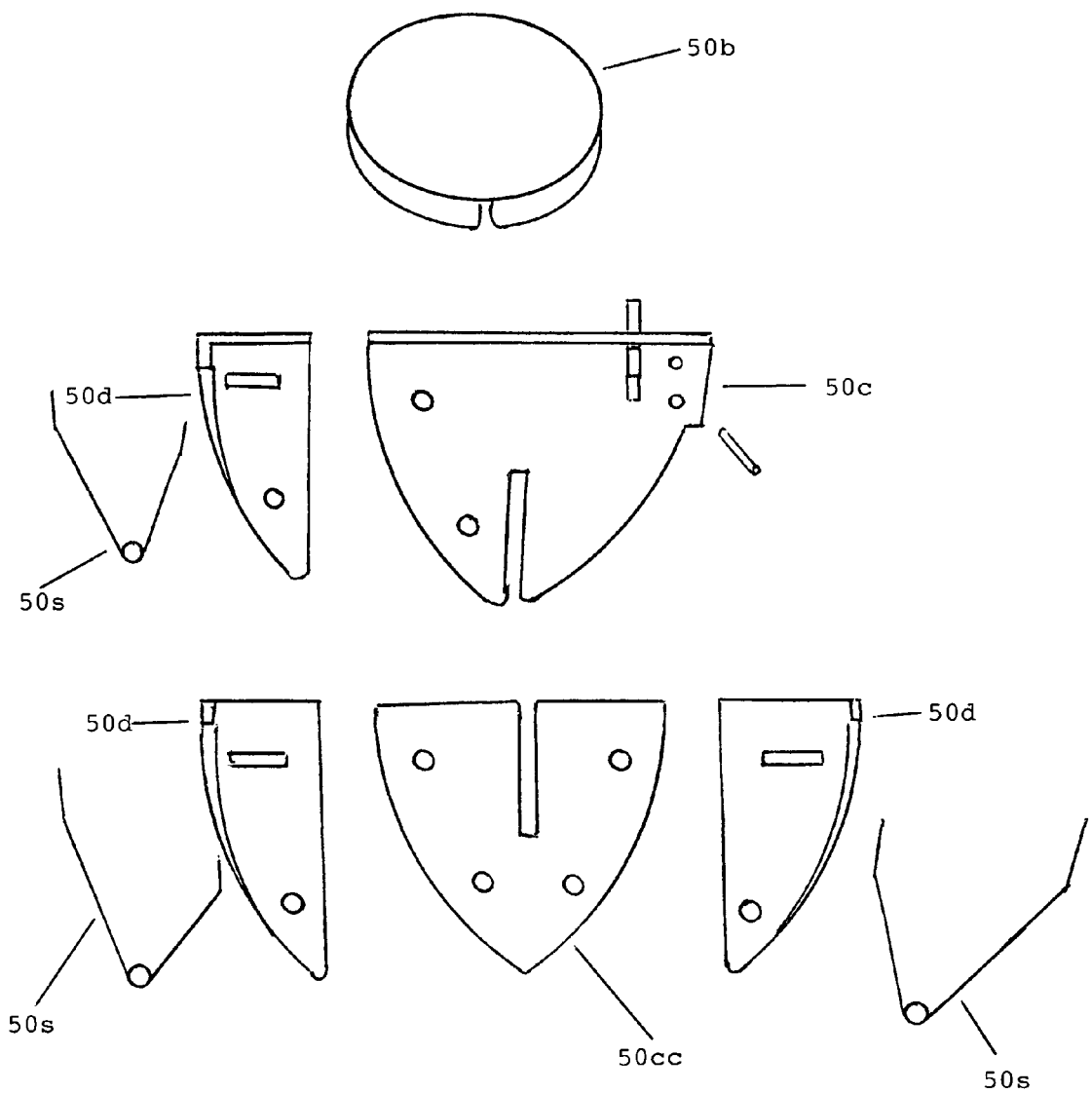
FIG. 6 is showing the carrying cam and its parts when dismantled.

Referring to FIG. 6 is the carrying cam (50) taken apart with all three lock plates (50d) and springs (50s) separated from the main slider plate (50c) and secondary slider plate (50cc) roll pin (50p) is to help steady the carrying cam action. Bump cap (50b) accepts the thrust of the projectile (55) and also welded the slider plates (50c) and (50cc) together.

CONCLUSION

It can now be seen that the present invention solves many of the problems associated with the prior art. The present invention provides with instant accurate transfer of working materials from near places to afar multiple locations with the switch of a button, from remote spot if so desirable.

Although the description above contains many specifications, these should not be construed as limiting the scope of the invention but as merely providing illustrations of some of the presently preferred embodiments of this invention. For example, powder charge can be of other propellants, etc. Thus the scope of the invention should be determined by the appended claims and their legal equivalents, rather than by the examples given.

I claim:

1. A multiple variable outlets shooting apparatus propels one or multiple projectiles with one charge of propellant comprising:
   a charge chamber housing said housing includes a cartridge chamber;
   a manifold-barrel unit said unit connects to at least one channel;
   said charge chamber housing and said manifold-barrel unit being configured, sized and positioned relative to each other with a gasket in between and is assembled with a number of bolts said shooting apparatus propels at least one projectile and said at least one projectile in turn dispatches at least one carrying cam with a work load such, as but not limited to, fishing net, safety net and animal net to a predetermined location a distance away.

2. A multiple variable outlets shooting apparatus as cited in claim 1 wherein said charge chamber housing having at least one port and also having at least one port door said at least one port door opens and closes to regulate pressure.

3. A multiple variable outlets shooting apparatus as cited in claim 1 wherein said charge chamber includes a set of electronic solenoid device said device controls the opening and closing of said at least one port door.

4. A multiple variable outlets shooting apparatus as cited in claim 1 wherein said cartridge chamber includes a propellant cartridge which is installed at a location with passage opens to said at least one port and said at least one port door.

5. A multiple variable outlets shooting apparatus as cited in claim 4 wherein said propellant cartridge said cartridge having a penetrable soft spot and said cartridge contains a charge of propellant adequate to send said carrying cam to said predetermined location and at the same time will not distort much of said at least one channel.

6. A multiple variable outlets shooting apparatus as cited in claim 4 wherein said cartridge chamber further includes an ignition device said device is connected and controlled by an electronic operation system said ignition device is placed with said propellant cartridge and being positioned relative to each other to allow the control and the firing of said propellant cartridge effectively.

7. A multiple variable outlets shooting apparatus as cited in claim 4 wherein said cartridge chamber also includes a lid said lid is configured, positioned and sized to fit said cartridge chamber and said lid also provides linkage and connection to said ignition device and said electronic operation system.

8. A multiple variable outlets shooting apparatus as cited in claim 1 wherein said manifold-barrel unit having at least one projectile installed at a predetermined location.

9. A multiple variable outlets shooting apparatus as cited in claim 1 wherein said projectile is built with tail pieces for keeping said projectile from vibration and rotation during action.

10. A multiple variable outlets shooting apparatus as cited in claim 1 wherein said projectile is installed with a soft cap to minimized noise.

11. A multiple variable outlets shooting apparatus as cited in claim 1 wherein said manifold-barrel unit is connected to at least one straight channel and said straight channel is reinforced to minimize distortion.

12. A multiple variable outlets shooting apparatus as cited in claim 1 wherein said manifold-barrel unit is connected to at least one curve channel and said curve channel is reinforced to minimize distortion.

13. A multiple variable outlets shooting apparatus as cited in claim 1 wherein said at least one carrying cam is installed to said at least one channel at a predetermined location.

14. A multiple variable outlets shooting apparatus as cited in claim 13 wherein said carrying cam includes several sliding plates to keep sliding action smooth and said sliding plates including a main sliding plate with holed protrusion to hook up work load such as, but not limited to, fishing net, safety net and animal net to a predetermined distance away.

15. A multiple variable outlets shooting apparatus as cited in claim 13 wherein said carrying cam further includes a locking mechanism said locking mechanism locks up with said work load when arrives at said predetermined location and prevents the reversal of said carrying cam with said work load such as, but not limited to, fishing net, safety net and animal net.

* * * * *